United States Patent [19]

Kuo

[11] Patent Number: 5,649,770
[45] Date of Patent: Jul. 22, 1997

[54] BALL CIRCULATING STRUCTURE FOR LINEAR GUIDE ASSEMBLY

[75] Inventor: Chang-Hsin Kuo, Taichung, Taiwan

[73] Assignee: Hiwin Technologies Corp., Taichung, Taiwan

[21] Appl. No.: 630,910

[22] Filed: Apr. 4, 1996

[51] Int. Cl.$^6$ .................................................. F16C 29/06
[52] U.S. Cl. ............................................................. 384/45
[58] Field of Search ..................................... 384/45, 43

[56] References Cited

U.S. PATENT DOCUMENTS

| | | | |
|---|---|---|---|
| 4,505,522 | 3/1985 | Tanaka | 384/45 |
| 4,610,488 | 9/1986 | Geka | 384/45 |
| 4,652,147 | 3/1987 | Geka | 384/43 |
| 5,108,197 | 4/1992 | Morita | 384/45 |
| 5,145,261 | 9/1992 | Narumiya | 384/45 |
| 5,152,614 | 10/1992 | Albert et al. | 384/45 X |

*Primary Examiner*—Thomas R. Hannon
*Attorney, Agent, or Firm*—Pro-Techtor International

[57] ABSTRACT

The present invention pertains to a ball circulating structure for linear guide assembly. The design of the invention is composed of loading grooves on rail, the connecting passage and directional guiding lip on sliding block. The objective of the invention is to reduce steel ball's angular acceleration when steel ball circulates between connecting passage and loading passage. In addition, this invention also intends to reduce the frictional resistance and noise of steel ball near the intersection between connecting passage and loading passage. In this invention, connecting passage is tangent to loading passage. There is quite a large radius of curvature near the tangent point. Especially, the radius of curvature of the tangent point is infinite. When the profile of the groove on trail rack is arc-shaped, there is one or two deep grooves on the sides of the groove. Therefore, directional guiding lip can be located deeply into the deep groove so that steel ball will not bump discontinuously when circulating between connecting passage and loading passage. In addition, the strength of directional guiding lip can be much increased.

5 Claims, 8 Drawing Sheets

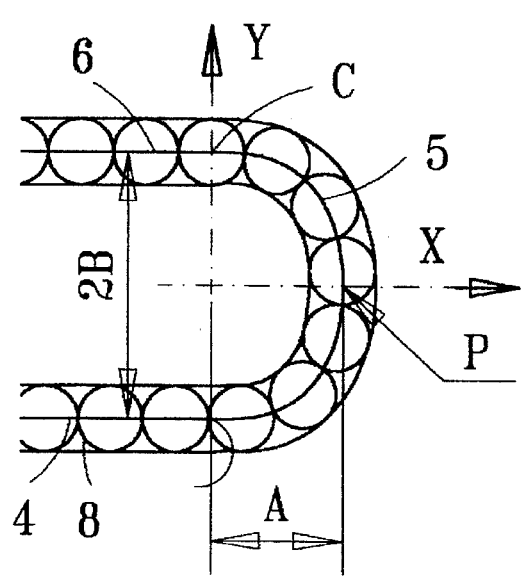
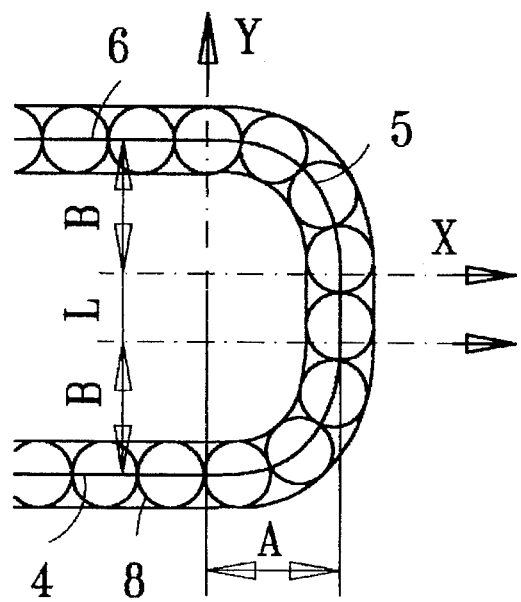
FIG. 1  FIG. 2
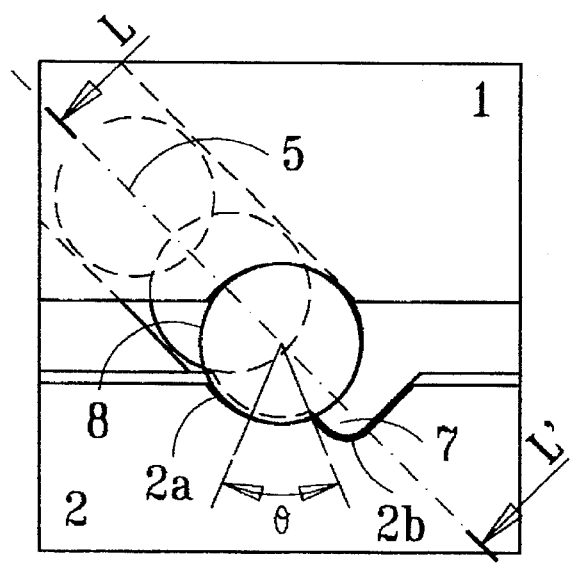
FIG. 3

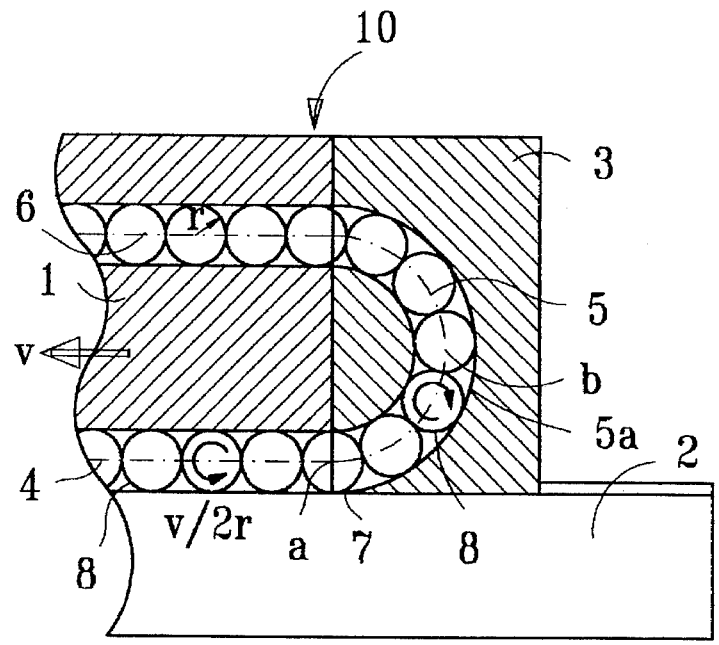
*PRIOR ART*
FIG. 6
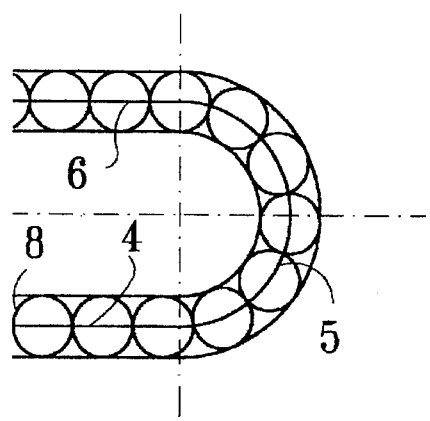 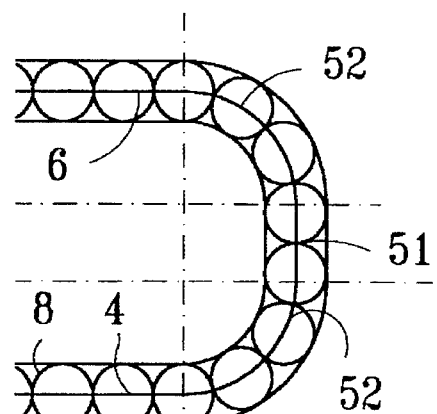
*PRIOR ART*
FIG. 7
*PRIOR ART*
FIG. 8

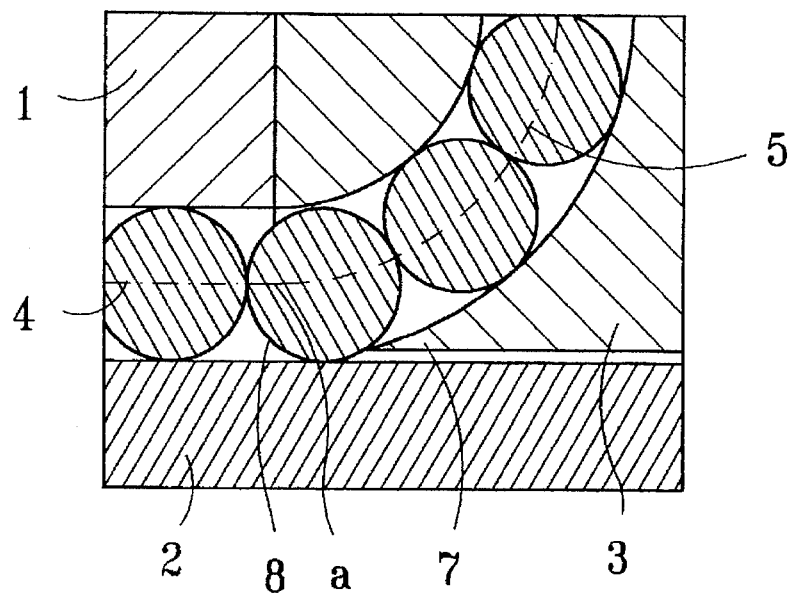
PRIOR ART
FIG. 9
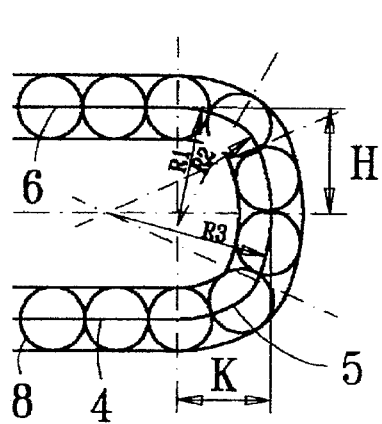 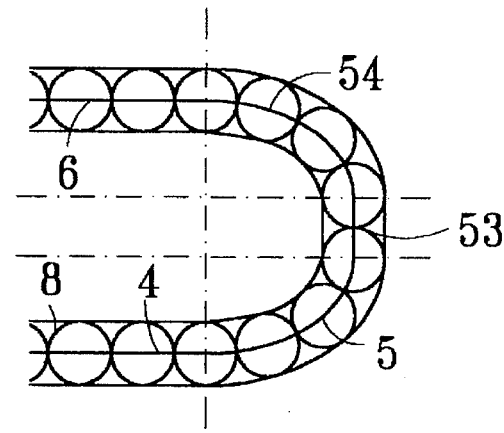
PRIOR ART
FIG. 10
PRIOR ART
FIG. 11

5,649,770

BALL CIRCULATING STRUCTURE FOR LINEAR GUIDE ASSEMBLY

BACKGROUND OF THE INVENTION

I. Field of the Invention

The present invention pertains to a new ball circulating system for linear guide assembly that will improve the smoothness of ball circulation of linear guide assembly.

II. Description of the Prior Art

Linear guide assembly has been extensively used in sophisticated machines and instruments. Linear guide assembly comprises of a finite straight rail, a set of steel balls and a sliding block which includes a block body, two end plates, two end seals, some steel ball retainers, and other accessories. While the sliding block and the rail move relative to each other, the circulating steel balls transfer the force between the sliding block and the rail. Meanwhile the slide friction only exists on the end seals but not on the other parts, so that the frictional force between the sliding block and the rail is virtual small.

Conventional linear guide assembly has several rows of arc-like grooves on block body. Those grooves where steel balls circulate between the rail and sliding block are parallel to rail. The passage that the steel balls circulate along the above mentioned grooves and bear the load is so called loading passage. There are also several tunnels in block body. These tunnels are parallel to each corresponding loading passage, and allow the steel balls circulating in between but without enduring any load. Then they are called unloading passages. In order to let steel balls circulate continuously, both ends of loading passage are connecting to a semicircular-like tunnel which is called connecting passage. Through the connecting passage, steel balls can circulate from loading passage to unloading passage and back to loading passage by through another connecting passage. Therefore, steel balls circulate continuously.

Conventional linear guide assembly's circulating system is shown in FIG. 6. There is no sliding motion between steel balls (8), sliding block (10) (which includes block body (1) and end plates (3)) and rail (2). The steel ball (8) on the loading passage (4) is moving at the center velocity of V/2 to the left relative to the rail (2) when the sliding block (10) moves to the left at the velocity of V relative to the rail (2). Meanwhile, the steel balls have an angular velocity of V/2r counterclockwise. Since the steel ball (8) moves to the right with a velocity of V/2 relative to the sliding block (10), the steel balls (8) circulate along the loading passage (4) into an intersection point (a) which is between loading passage (4) and the connecting passage (5). The steel balls (8) strike the connecting tunnel's lip edge (7) which is called directional guiding lip (7). If the steel balls circulate in the connecting passage and contact with the outer surface of the tunnel without relative sliding motion, the steel balls' angular velocity is V/2r in clockwise direction, but it is in the counterclockwise direction during the loading passage (4). Near the directional guiding lip, the angular velocity and kinetic energy of the steel balls change rapidly in order to reduce frictional resistance, so the directional guiding lip (7) will bear a large force. When the steel balls (8) strike at the directional guiding lip (7), there is a large clockwise torque, a leftward and upward force. As a result, these forces will cause the directional guiding lip to wear as well as induce noises and increase the frictional resistance of linear guide assembly. Due to the kinetic energy is proportional to the square of the velocity, the noise and sliding resistance is increased by exponent when the moving velocity of the sliding block increase. In order to improve the production efficiency, the sliding block's speed will be increased continuously. Therefore the striking problem of the directional guiding lip will become much more severe.

Due to the centrifugal effect, the steel balls usually contact with the outer circularity (5a) of the tunnel when they circulate in the connecting passage (5). The steel balls are sliding and rolling relative to the outer circularity of the connecting tunnel. Because of the centrifugal force of the steel ball is proportional to the square of the velocity, if the moving velocity of the sliding block relative to the rail increases; the normal force exerted on the steel ball and the surface of outer circularity (5a) will increase exponentially. Besides, the coefficient of sliding friction of the steel ball and the connecting tunnel is usually much larger than steel balls themselves. Most of the resistance between the steel ball and the connecting tunnel is rolling friction, so the sliding friction is relatively small portion.

Two conventional connecting passages are shown in FIG. 7 and FIG. 8. FIG. 7 is the oldest design in which the center of steel ball (8) circulates along a semicircular tunnel; both loading passages (4) and unloading passage (6) are straight and connecting passage (5) is a semi-circular. The modified type of FIG. 7 as shown in FIG. 8 is to modify the semi-circular passage (5) of FIG. 7 into a combination of two quarter-circular (52) and a tangential straight passage (51).

Two types of circulating passage mentioned above have been studied quite a lot in U.S. Pat. No. 4,505,522. However, the patent focuses on the effect of the amount of steel balls circulating in the connecting tunnel on the frictional resistance of linear guide. There is no discussion of the problem concerning about steel balls striking the directional guiding lip. The designs of these two traditional connecting tunnels are tangential to loading passage in order to reduce the striking resistance by the steel ball as shown in FIG. 6. However, since the radius of curvature of directional guiding lip in the connecting passage is not infinite, the steel balls at directional guiding lip are under a large force. As a result, the normal force of steel balls exerted on directional guiding lip will increase and so will the relative friction. The friction between steel balls and directional guiding lip is sliding friction instead of the smaller rolling friction. Therefore, if sliding block moves rapidly relative to rail, steel balls will understate a very large striking force. Besides, if the groove in rail of conventional linear guide of circulating ball is arc-shaped and directional guiding lip is tangential to loading groove, the tip of directional guiding lip will become very sharp and easy to be broken down. Directional guiding lip can not contact with rail directly and there is a seam in between.

FIG. 9 is an enlargement figure of the surrounding of directional guiding lip (7). From that figure, it can be seen that there is a discontinuous bumping when steel balls (8) circulate from loading passage (4) into connecting tunnel (5). The discontinuity will consequently increase the noise and frictional resistance of linear guide assembly of circulating ball.

Mr. Geka in U.S. Pat. No. 4,652,147 proposed another two types of connecting passages. As shown in FIG. 10, the first type modified the semicircular shape of connecting passage (5) to a combination of several tangential arcs. Three arcs constitute the upper right of FIG. 10. The radius of the first arc is R1. The radius of the second arc is R2. The radius of the third arc is R3. The second arc is tangential to the first and third arc respectively. R2 is obviously a lot smaller than R1 and R3. As shown in FIG. 10, the R2 is designed to be moved to the upper right and the lower left portion of the connecting passage to avoid the interference for the steel ball's circulation. Therefore, the radius of curvature near the directional guiding lip can have more space. As shown in FIG. 11, the second type modified conventional semicircular shape of connecting tunnel to a half ellipse or a combination of two quarter ellipses (54) and a tangential line (53).

"A" denotes the radius of major axis of ellipse. "B" denotes the radius of minor axis of ellipse. Ellipse can be denoted as the following formula:

$$X^2/A^2+Y^2/B^2=1 \ldots \tag{1}$$

The radius of curvature of the major axis's top point is $B^2/A$ which is the minimum value. The radius of curvature of the minor axis's top point is $A^2/B$ which is the maximum value. The top point of minor axis of ellipse in FIG. 11 is located at directional guiding lip of connecting passage in order to reduce the normal force exerted on directional guiding lip.

The characteristics of the above modification is that the top points of major axis are the smallest radius of curvature and that of minor axis is the largest radius of curvature as shown in FIG. 11. Meanwhile the top point of major axis (the smallest radius of curvature) is on the upper right and lower right of FIG. 11 and directional guiding lip on the top point of minor axis (the largest radius of curvature). Although both the first and second modifications have enlarged the radius of curvature of connecting tunnel near directional guiding lip and thus reduced noise and frictional resistance of linear guide assembly, the two basic problems still exist in conventional linear guide: the tip of directional guiding lip still undertakes centrifugal force and the discontinuous bumping phenomena of steel balls are still present.

In order to reduce the size of the sliding block, the connecting tunnel of linear guide of circulating ball is sometimes not located at the plane but on a curvature plane. As shown in FIG. 12 (U.S. Pat. No. 4,610,488), the center of connecting passage (5) in sideview is not a straight line but a curve Q—Q'. The length of Q—Q' curve is equal to 2 B of equation (1).

The steel ball (8) which circulates into connecting passage (5) from loading passage (4) can be clearly seen in FIG. 9. At the intersection point (a) of the loading passage and the connecting passage, the steel balls have not been changed the circulating direction by the directional guiding lip (7). The steel ball keeps on moving along with the loading groove (4) until strike to the tip of directional guiding lip. As a result, steel ball bumps discontinuously to induce noise and increase the frictional resistance. FIG. 13 and FIG. 14 are two types of side view of FIG. 9. In these two circulating ways, the seam between the steel ball (8) and the steel ball groove (2a) is so small that the directional guiding lip (7) becomes very sharp. In addition, there is quite a distance from the tip of the directional guiding lip to the contact surface of block body (1) and end plate (3). Therefore, there is a section that steel ball circulates without any guiding. As shown in FIG. 13, the circulating direction of steel balls is perpendicular to the contact face of steel balls and groove. As shown in FIG. 14, there is one kind of design (such as U.S. Pat. No. 5,108,197) in which the angle between the steel balls circulating direction and the contact face's normal vector direction is under 60 degrees in order to reduce the size. The clearance between the steel ball and the groove is quite small so that either the tip of directional guiding lip becomes very sharp or the steel ball bumps discontinuously as shown in FIG. 9. The cross sections of steel ball groove on rail 2a and 2a' in FIG. 13 and FIG. 14 respectively indicate that their arc lengths are very long. However, the effective range to sustain the steel ball's loading is the contact point between the steel ball and the groove. The range of the contact point is θ as shown in FIG. 13 and 14 and the effective area is only within 45 degree. The tip of directional guiding lip is still very sharp and the steel ball still bumps discontinuously. As shown in FIG. 13, it can not machine an escaped groove on the efficient range of groove to undertake the steel ball's loading because the steel ball's circulating direction is perpendicular to the contact surface between the steel ball and groove or the angle between the steel ball's circulating direction and the contact surface's normal vector direction is not large enough.

SUMMARY OF THE INVENTION

It is an object of the present invention to provide a new type ball circulating structure for linear guide which have three characteristics. Firstly, the tip of directional guiding lip is tangent to loading passage and the radius of curvature of the curve at tangent point is infinity. Since the tip of directional guiding lip is tangent to loading passage, steel balls will not bump continuously near the tip of directional guiding lip. In addition, because the radius of curvature at tangent point is infinity, the steel balls will not bear a centrifugal force and hence the normal force and frictional resistance between steel balls and the tip of directional guiding lip will be reduced. Secondly, all the connecting passage is constituted by continuous smooth curves. A tangent straight line or several tangent curves are not needed so that design is much more convenient. Because it is not necessary to have any tangent straight lines in connecting passage, this new design can have a little larger radius of curvature than that of the connecting passages which comprise of a tangent straight line. The new design can make steel balls circulating much more smoothly. Thirdly, the thickness of end plate is no longer a factor of the curvature of the semi-circular. Both the distance denoted "A" in FIG. 1,2 and "K" in FIG. 10 and the distance denoted "B" in FIG. 1,2 can be freely and independently chosed.

BRIEF DESCRIPTION OF THE DRAWINGS

The drawings disclose an illustrative embodiment of the present invention which serves to exemplify the various advantages and objects hereof; and are as follows:

FIG. 1 is a schematic diagram of the first type of connecting passage of the present invention;

FIG. 2 is a schematic diagram of the second type of connecting passage of the present invention;

FIG. 3 is a cross sectional view of steel ball groove on rail of the present invention, which is a single circular and shows the relationship between rail, connecting passage and directional guiding lip for the first type;

FIG. 4A is a three-dimensional diagram along L—L' of FIG. 4;

FIG. 6 is a diagram of traditional linear guide;

FIG. 7 is a diagram of the first type of connecting passage of prior art;

FIG. 8 is a diagram of the second type of connecting passage of prior art;

FIG. 9 is a cross sectional view of prior art near directional guiding lip;

FIG. 10 is a diagram of the third type of connecting passage of prior art;

FIG. 11 is a diagram of the fourth type of connecting passage of prior art;

Figure 3A:
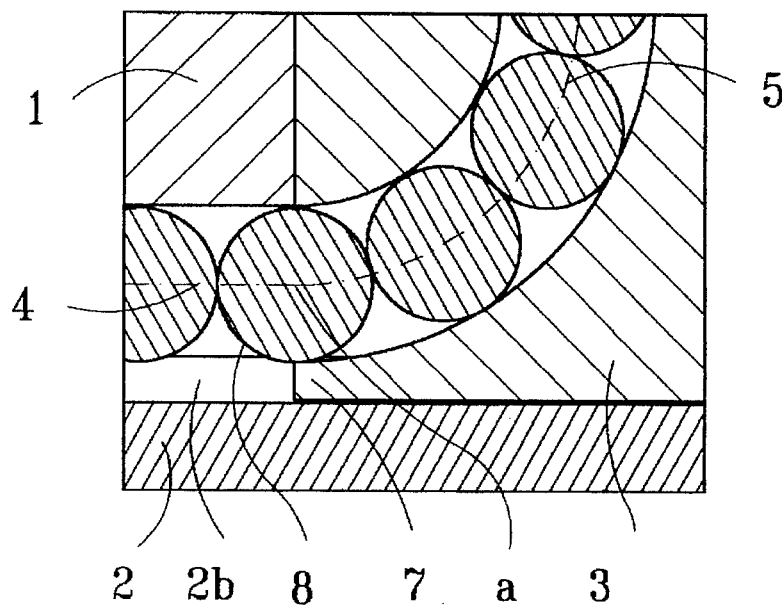
FIG. 3A is a cross sectional view along L—L' of FIG. 3.

Table 1 is a comparison table for the trace of center of steel ball in different types of connecting passage design.

DETAILED DESCRIPTION OF THE PREFERRED EMBODIMENT

FIG. 1 is a new design for connecting passage of the present invention. In this figure, the most right end point (P) of connecting passage (5) is called the top point of connecting passage. For easier to explain the drawing, we set Y axis is upward and passes through two points, (a) and (c), the end points of connecting passage (5). X axis passes through the top point of the connecting passage and is perpendicular to Y axis. The direction of X axis is rightward. The distance between point P and the origin point of coordinate denote "A". The distance between unloading groove (6) and loading groove (4) is "2B" as shown in FIG. 1. The trace for center of connecting passage (5) is expressed as following:

$$X^n/A^n + Y^2/B^2 = 1, n \geq 2.5 \ldots \quad (2)$$

This formula is obtained by modifying equation (1).

There are three characteristics of above mentioned new passage. Firstly, the tip of directional guiding lip (7) is tangent to loading groove (4) and the radius of curvature of curve at tangent point is infinity. Since the tip of directional guiding lip (4) is tangent to loading groove, steel balls will not bump on the tip of directional guiding lip. In addition, due to the radius of curvature is infinite, the steel balls will not undertake a centrifugal force so the normal force and frictional resistance between steel balls and the tip of directional guiding lip will be reduced. Secondly, the complete connecting passage is constituted by continuous smooth curves. A tangent straight line or several tangent curves are not needed so the design is much easier. Besides because it is not necessary to have tangent straight line in connecting passage, the minimum radius of curvature of this present design is a little larger than that of connecting passage which has a tangent straight line. Hence the new design can make steel balls circulate more smoothly. Thirdly, for this new design, one can freely choose the distance A from the origin point to the top point of connecting passage as well as distance B from the oringin point to unloading passage.

Figure 12:
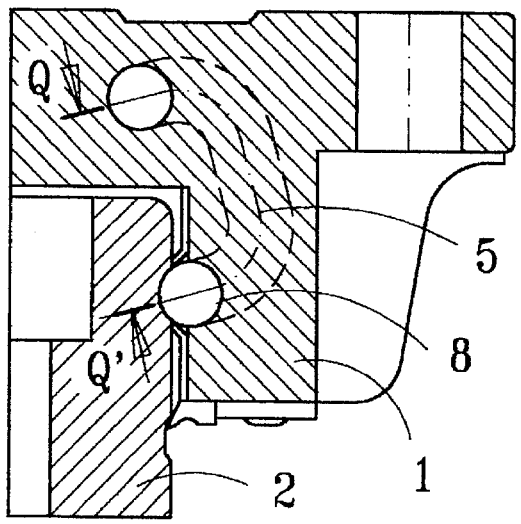
FIG. 12 is cross sectional view of linear guide of circulating ball of prior art.
Figure 13:
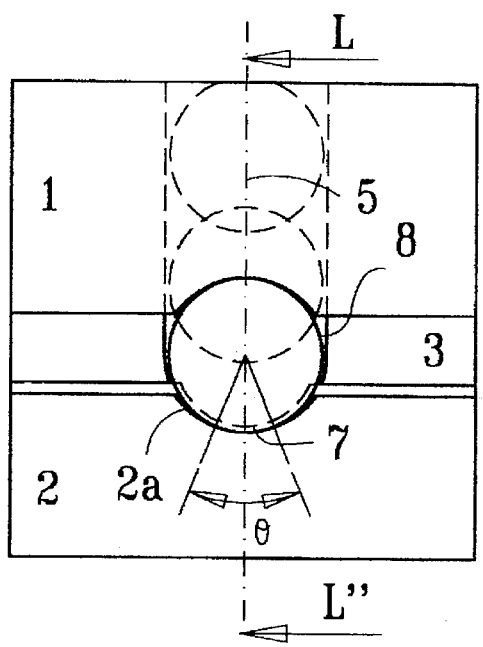
FIG. 13 is a cross sectional view of steel ball's groove on rail of prior art which shows the design of the rail and directional guiding lip for the first type.
Figure 14:
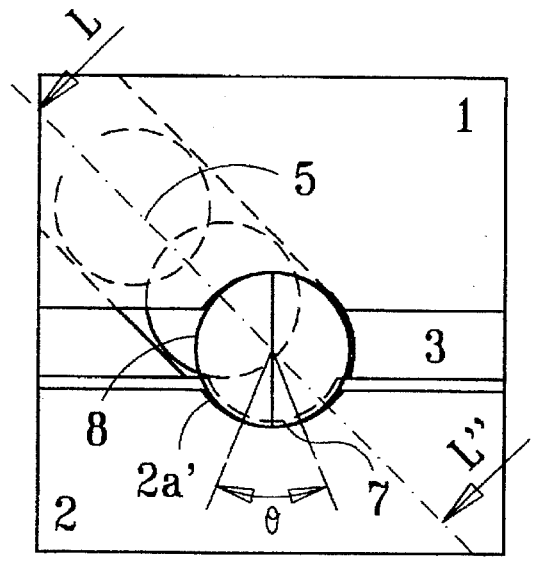
FIG. 14 is a cross sectional view of steel ball's groove on rail of prior art which shows the design of the rail and directional guiding lip for the second type.
Figure 13A:
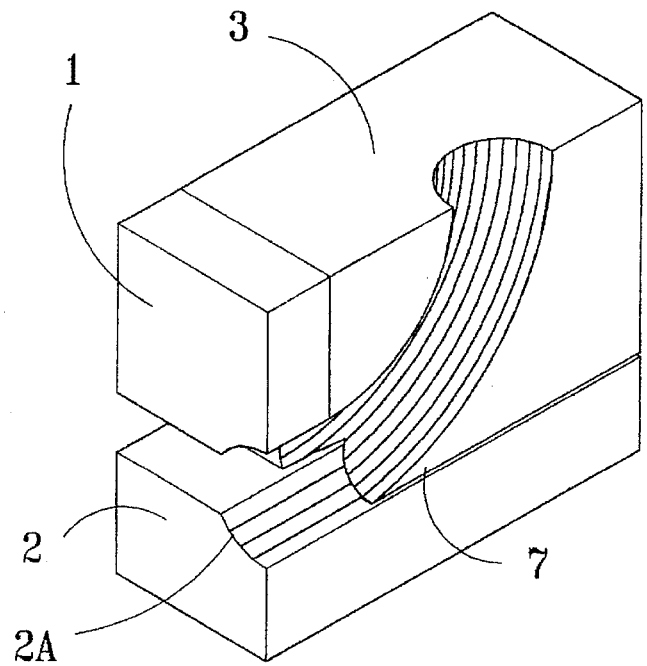
FIG. 13A is a three-dimensional diagram along L—L' of FIG. 13.
Figure 14A:
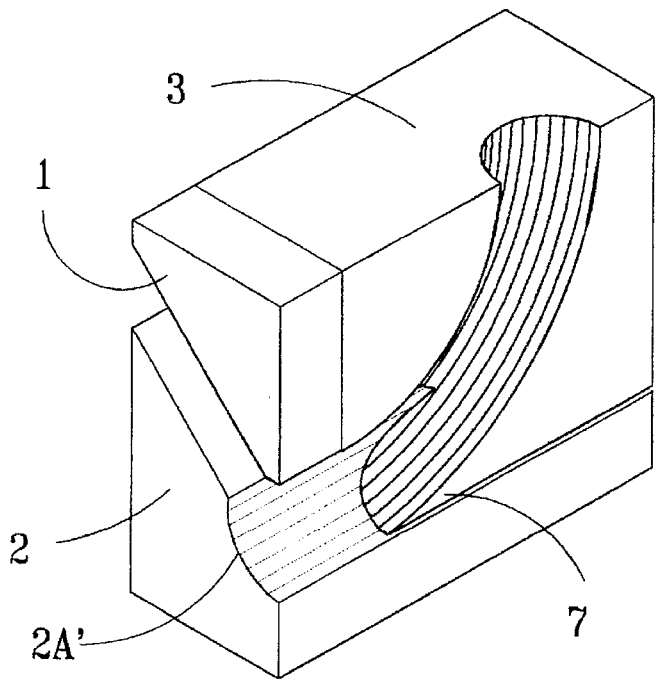
FIG. 14A is a three-dimensional diagram along L—L' of FIG. 14.

As shown in FIG. 12, the connecting passage is not on a simple plane. The connecting passage can develop along curve's surface. When Q—Q' curve is developed along Y axis, the length of Q—Q' is equivalent to "2B" in equation (1). If "B" is far larger than "A" (FIG. 1), one can add a segment L between the up-part and down-part of the curve as shown in FIG. 2.

Figure 3B:
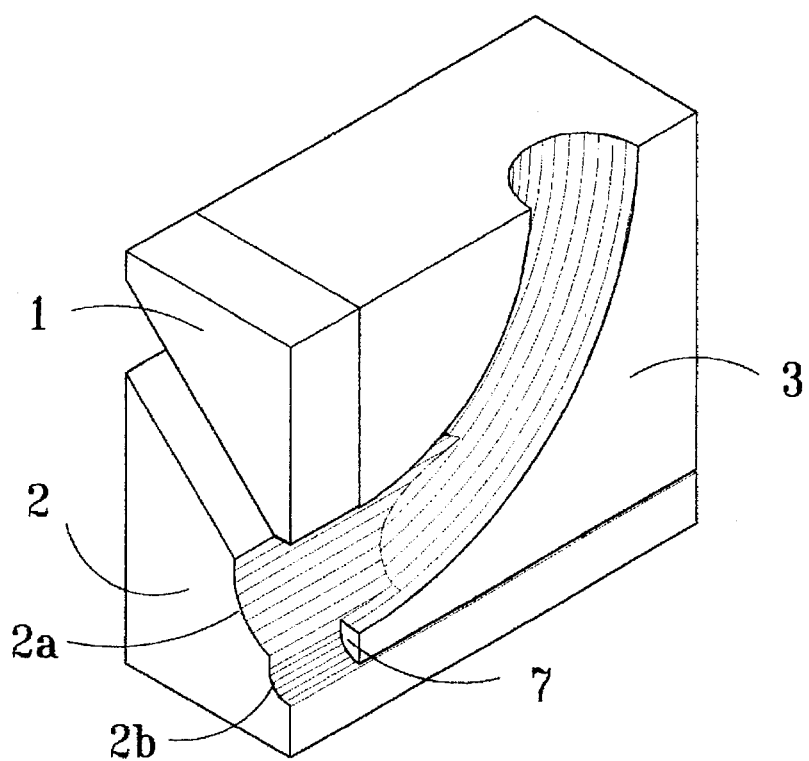
FIG. 3B is a three-dimensional diagram of FIG. 3A.

The arc length of cross sections of steel ball groove on rail (2a and 2a') is quite long. However, the effective area to sustain the steel ball's loading is near the contact point between steel ball and the groove which indicate as θ (which is within 45 degrees). As shown in FIG. 3, there is a deep groove (2b) on the right side of groove (2a) which is non-loading zone. Directional guiding lip (7) can be inserted into this deep groove (2b). Due to this deep groove (2b), the directional guiding lip can be thicker and stronger. There can be easily seen in FIG. 3A and FIG. 3B where the tip of directional guiding lip in the connecting passage can be quite thick. Therefore, the strength of directional guiding lip is increased and the phenomenon of steel ball's discontinuous bumping is also solved.

Figure 4:
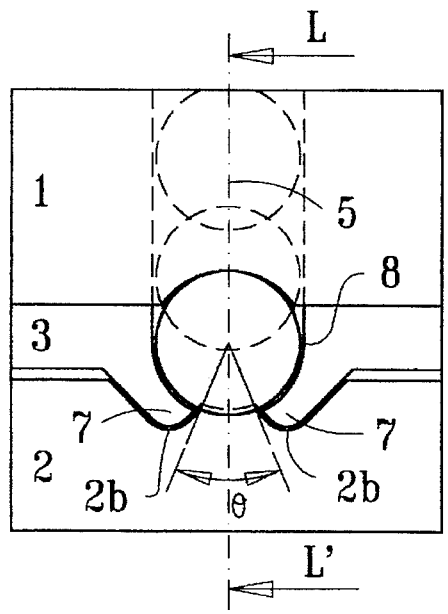
FIG. 4 is a cross sectional view of steel ball groove on rail and shows the relationship between the second type of connecting passage and directional guiding lip.
Figure 4:
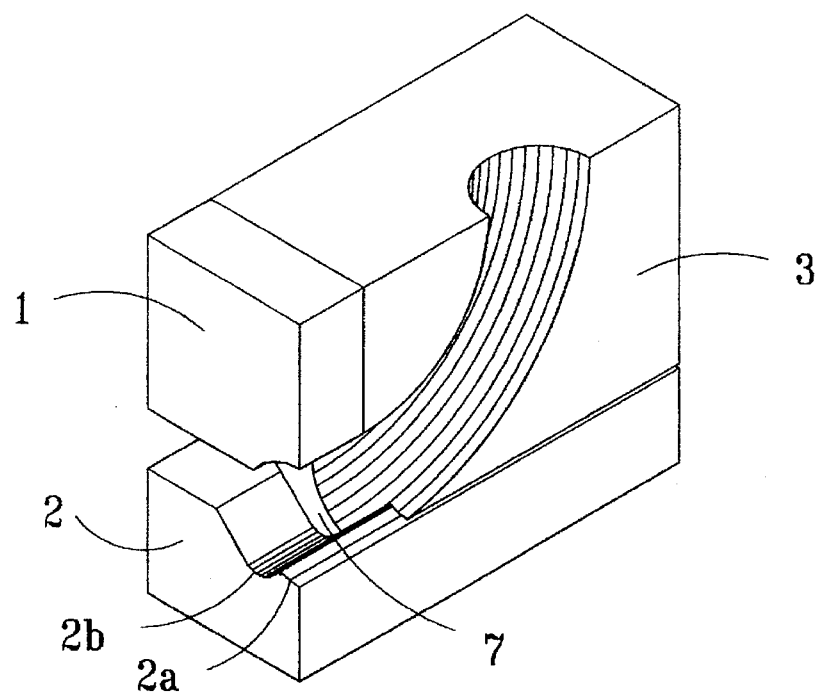

Because steel ball's circulating direction is perpendicular to the contact surface of steel ball and steel ball groove (2a) (or the angle between steel ball's circulating direction and the contact surface normal vector's direction is not large) as shown in FIG. 12, the escape grooves can only be installed in the area where groove does not sustain steel ball's loading. Therefore, there are two deep grooves (2b) on each side of the effective area of loading groove of the rail in this present invention as shown in FIG. 4. While steel ball circulate into connecting passage (5) from loading passage, the steel ball is guided by the directional guiding lip which can help steel ball smoothly move from loading passage into connecting passage. Directional guiding lip (7) in deep groove (2b) on the rail can be easily seen in FIG. 4A and the efficient guiding distance of steel ball will also increase. Equation (2) can be modified by using the form of Y=f(x) as the following;

$$Y = \pm B(1 - X^n/A^n)^{1/2} \text{ where } n \geq 2.5 \ldots \quad (3)$$

If curve can be expressed by using function Y=f(x), radius of curvature R at any point on the curve can be obtained by the following equation;

$$R = Abs[(1+f'^2)^{3/2}/f''] \ldots \quad (4)$$

Therein, Abs[ ] denotes absolute value, f denotes the first order differentiation, f' denotes the second order differentiation. When x=0, then f=0 and f'=0 for eq.(3). The slope is equal to zero and the radius of curvature is infinite when x is equal to zero on the functional diagram. Because the tip of directional guiding lip (7) in connecting passage (5) is tangent to loading groove (4) and the radius of curvature at the tip is infinite, steel ball (8) at the tip does not undertake centrifugal force so that the normal force applied to the steel ball and the tip of directional guiding lip is reduced and so does sliding resistance.

Figure 5:
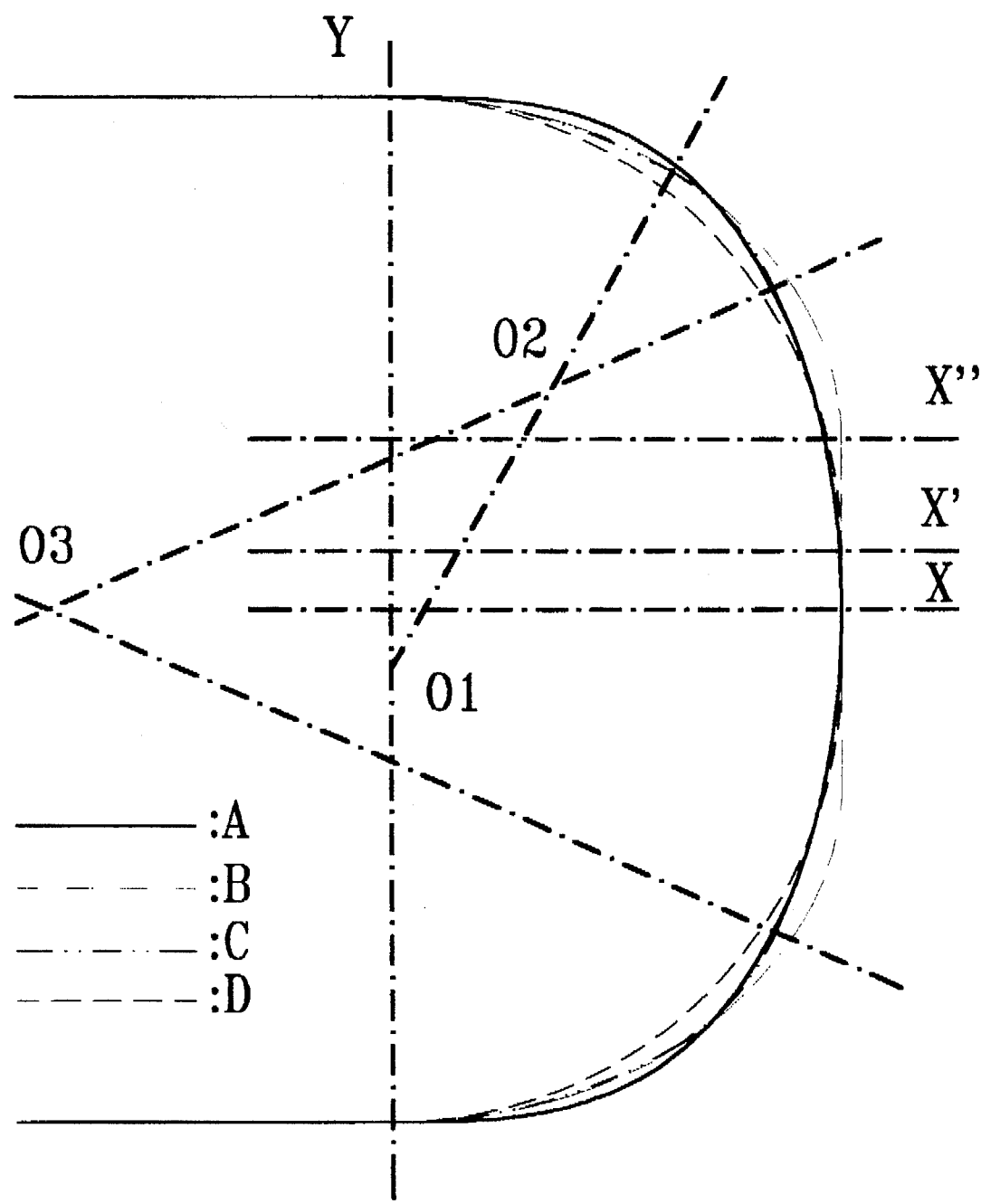
FIG. 5 compares the circulating trace of the center of steel ball in connecting passage of the present invention with that of the prior art.

In order to compare the connecting passage of the present invention with that of prior arts, one can take several tangent arcs' H and K to confine the space of limit of connecting passage in FIG. 10 and integrate the passages of relating connecting passage as FIG. 5. By measuring the scale, H is 1.127 times of K (It means that H=1.127K), R1=1.256K, R2=0.543K, R3=1.757C Therefore, the radius of curvature of directional guiding lip is 1.256K and the minimum radius of curvature is 0.543K (C curve in FIG. 5). D curve in FIG. 5 is designed to comprise of two quarter-circular and a tangent straight line. The radius of circular is K and the length of tangent straight line is 0.254K. B curve in FIG. 5 is designed to comprise of Geka's two quarter-ellipse and a tangent straight line. Assume the ratio of major axis to minor axis is 4/3, therefore the length of minor axis is 0.75K; the radius of curvature at the tip of directional guiding lip is 1.333K; the minimum radius of curvature is 0.563K. "A" curve in FIG. 5 is the curve of the present invention., "A" value is K in formula(2), "B" value is 1.127K, the radius of curvature for the tip of directional guiding lip is infinity, the minimum radius of curvature is 0.642K The relative data is shown in Table 1. The radius of curvature at the tip of directional guiding lip in connecting passage of the present invention is far larger than that of prior arts. Besides, the present invention has no virtual minimum radius of curvature of arc in the passage for steel balls' circulation. The smallest radius of curvature in the passage of the present invention is larger than those of Geka's two types of groove.

TABLE 1

| No. | Type | The radius of curvature at the tip of directional guiding lip | The smallest radius of curvature |
| --- | --- | --- | --- |
| A | The present invention | Infinity | 0.642K |
| B | Ellipse + straight line | 1.333K | 0.563K |
| C | Several tangent arcs | 1.256K | 0.543K |
| D | Circular + straight line | K | K |

Many changes and modifications in the above described embodiment of the invention can, of course, be carded out without departing from the scope thereof. Accordingly, to promote the progress in science and the useful arts, the invention is disclosed and is intended to be limited only by the scope of the appended claims.

What is claimed is:

1. A ball circulating structure for a linear guide assembly comprising:

a loading passage with arced grooves on both a sliding block and a rail bearing a load from circulating steel balls, said grooves are parallel to said rail, an unloading passage forming a hollow area inside said sliding block and corresponding to said loading passage, a cross section of said hollow area is shaped so as to not interfere with the circulation of said steel balls, two connecting passages connected to both ends of said loading passage and unloading passage, two ends of said connecting passage are tangential to said loading passage and to said unloading passage so that said steel balls circulate smoothly; wherein when a line between two end points of each said connecting passage is defined as a Y axis, and an X axis is perpendicular to said Y axis and is directed outward, then a trace of said connecting passages satisfies the formula $X^n/A^n + Y^2/B^2 = 1$, $n \geq 2.5$, where A is the distance from the intersection point of said connecting passages and X axis to the origin point of the coordinate, and the distance between the end point of said connecting passages and said X axis is B, B also being one half the distance between said loading and said unloading passage.

2. A ball circulating structure for a linear guide assembly comprising:

a loading passage with arced grooves on both a sliding block and a rail bearing a load from circulating steel balls, said grooves are parallel to said rail, an unloading passage forming a hollow area inside said sliding block and corresponding to said loading passage, a cross section of said hollow area is shaped so as to not interfere with the circulation of said steel balls, two connecting passages connected to both ends of said loading passage and unloading passage, two ends of said connecting passage are tangential to said loading passage and to said unloading passage so that said steel balls circulate smoothly; wherein when a line between two end points of each said connecting passage is defined as a Y axis, and an X axis is perpendicular to said Y axis and is directed outward, then a full trace of said connecting passages does not comply with a formula $X^n/A^n + Y^2/B^2 = 1$, $n \geq 2.5$, where A is the distance from the intersection point of said connecting passages and X axis to the origin point of the coordinate, and the distance between the end point of said connecting passages and said X axis is B, B also being one half the distance between said loading and said unloading passage, and a partial trace of said connecting passage over the A/2 distance from the end point of said loading passages complies with the formula $X^n/A^n + Y^2/B^2 = 1$, $n \geq 2.5$, where A is the distance from the intersection point of said connecting passages and X axis to the origin point of the coordinate, and the distance between the end point of said connecting passages and said X axis is B, B also being one half the distance between said loading and said unloading passage.

3. A ball circulating structure for a linear guide assembly comprising:

a loading passage with arced grooves on both a sliding block and a rail bearing a load from circulating steel balls, said grooves are parallel to said rail, an unloading passage forming a hollow area inside said sliding block and corresponding to said loading passage, a cross section of said hollow area is shaped so as to not interfere with the circulation of said steel balls, two connecting passages connected to both ends of said loading passage and unloading passage, two ends of said connecting passage are tangential to said loading passage and to said unloading passage so that said steel balls circulate smoothly; wherein an angle between a surface of a curvature of said connecting passage and a direction in which said steel balls sustain loading is greater than thirty degrees, and deep grooves are included on said rail, said deep grooves are parallel to said arced grooves, and an arc of a contact surface of said rail is between 15 degrees and 50 degrees, and directional guiding lips of said connecting passages are inserted into said deep grooves so as to form an escape groove with a depth greater that one quarter of the radius of said steel balls.

4. A ball circulating structure for a linear guide assembly comprising:

a loading passage with arced grooves on both a sliding block and a rail bearing a load from circulating steel balls, said grooves are parallel to said rail, an unloading passage forming a hollow area inside said sliding block and corresponding to said loading passage, a cross section of said hollow area is shaped so as to not interfere with the circulation of said steel balls, two connecting passages connected to both ends of said loading passage and unloading passage, two ends of said connecting passage are tangential to said loading passage and to said unloading passage so that said steel balls circulate smoothly; wherein an angle between a surface of a curvature of said connecting passage and a direction in which said steel balls sustain loading is thirty degrees or less, and deep grooves are included on said rail, said deep grooves are parallel to said arced grooves, and an arc of a contact surface of said rail is between 15 degrees and 50 degrees.

5. The ball circulating structure for a linear guide assembly as claimed in claim 4 wherein:

directional guiding lips of said connecting passages on said sliding block are inserted into said deep grooves.

* * * * *